United States Patent [19]
Casteel et al.

[11] Patent Number: 5,138,754
[45] Date of Patent: Aug. 18, 1992

[54] DOUBLE GRIPPER TUBE PULLER

[75] Inventors: James E. Casteel, Chattanooga; Charles T. Harden, Hixson, both of Tenn.

[73] Assignee: Combustion Engineering, Inc., Windsor, Conn.

[21] Appl. No.: 796,876

[22] Filed: Nov. 25, 1991

Related U.S. Application Data

[63] Continuation of Ser. No. 290,334, Dec. 27, 1988, abandoned.

[51] Int. Cl.⁵ .......................... B23P 19/04; B66C 1/56
[52] U.S. Cl. ......................................... 29/252; 294/94
[58] Field of Search .............. 294/86.15, 86.24–86.26, 294/86.3, 86.31, 88, 93–97, 906; 29/234, 235, 237, 244, 252, 282, 723, 726; 279/2 R

[56] References Cited

U.S. PATENT DOCUMENTS

| | | | |
|---|---|---|---|
| 1,039,382 | 9/1912 | Goldner | 294/94 X |
| 3,057,631 | 10/1962 | La Fleur | 29/282 |
| 3,085,825 | 4/1963 | Cauchois et al. | 294/94 |
| 3,278,220 | 10/1966 | Wilson | 294/94 X |
| 3,369,287 | 2/1968 | Brochetti | 29/252 |
| 3,691,609 | 9/1972 | Ice et al. | 29/252 |
| 4,077,102 | 3/1978 | Smith | 29/252 |
| 4,639,998 | 2/1987 | Shallenberger et al. | 29/723 X |
| 4,659,126 | 4/1987 | Breck et al. | 294/93 |

FOREIGN PATENT DOCUMENTS

| | | | |
|---|---|---|---|
| 1135656 | 5/1957 | France | 294/94 |
| 38678 | 9/1985 | Japan | 294/95 |
| 483288 | 2/1970 | Switzerland | 294/906 |
| 318536 | 1/1972 | U.S.S.R. | 294/96 |
| 740682 | 6/1980 | U.S.S.R. | 294/96 |

*Primary Examiner*—Johnny D. Cherry
*Attorney, Agent, or Firm*—John H. Mulholland

[57] ABSTRACT

A tool for axially removing a defect-containing length portion from a steam generator tubesheet primary side grips the tube length portion on both sides of the defect by radially outwardly moving gripper structure in the form of expanding ferrules (16,20) or collet spring fingers (60). Structure in the form of a central mandrel member (12, 13 or 50, 52, 54) moves axially to actuate the gripper structure. A sleeve (62) separately actuated on the mandrel (50) assists this action in the collet spring finger (60) embodiment. Movement of the defect-containing length portion requires an initial cutting of the tube-to-tubesheet weld, and for convenience, separation of the tube length portion from the remainder of the tube. Hydraulic structure (32, 56, 64) provides the motion axially of the grippers' actuators (14, 22, 23 or 58, 66) on either side of the defect either independently or together.

5 Claims, 2 Drawing Sheets

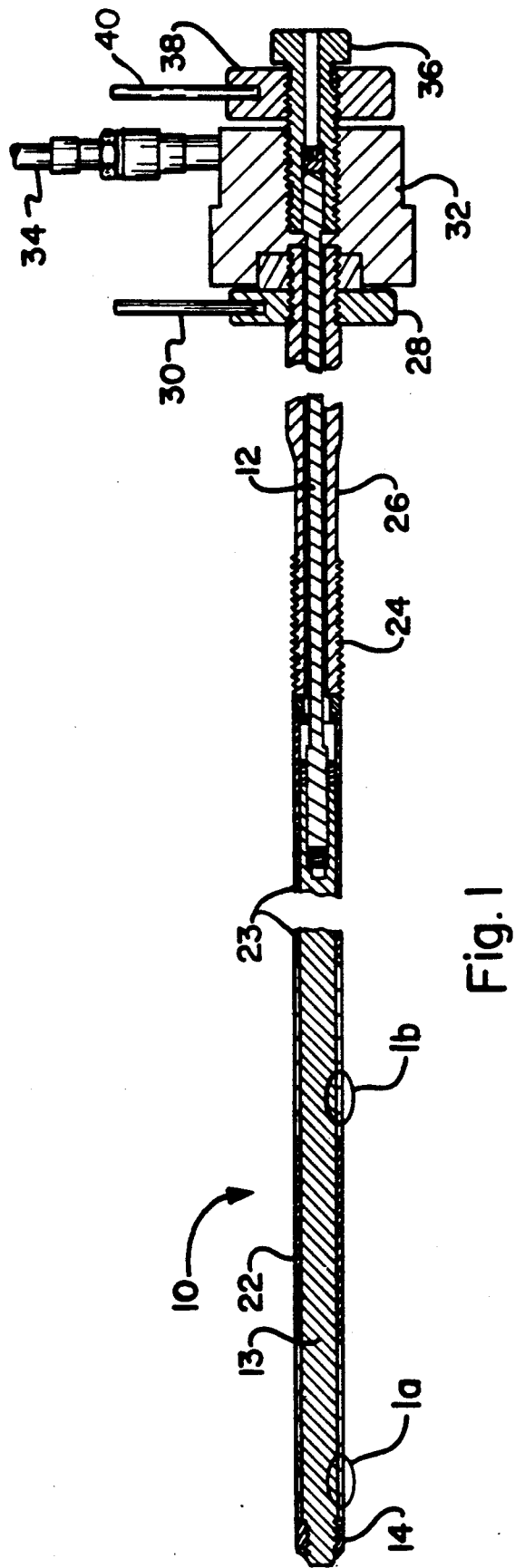
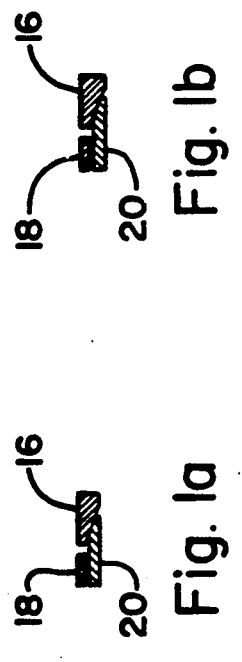
Fig. 1
Fig. 1a
Fig. 1b

DOUBLE GRIPPER TUBE PULLER

This is a continuation of copending application Ser. No. 07/290,334 filed on Dec. 27, 1988, now abandoned.

BACKGROUND OF THE INVENTION

Field of the Invention

The invention relates to repair of steam generators of the type which may be found in either nuclear or fossil steam supply systems for the generation of power. It is especially useful in the case of repairing nuclear steam generators, however, because its use minimizes the time involved in removal of defect-containing length portions of tubes from steam generators and thus the exposure time to radiation of repair personnel in, or adjacent to, the steam generator. The tool also may be adapted for use as an end effector of a remote manipulator of the type now commonly used to repair nuclear steam generators to minimize operator exposure.

SUMMARY OF THE INVENTION

The invention is a tool for axially removing a defect-containing length portion of a tube which has been cut from both the remainder of the tube and from the tube support member.

The tube, typically, is an Iconel nuclear steam generator tube and the supporting member is, typically, a tubesheet, the primary side from which, the removal operation is performed. During service, such nuclear steam generator tubes develop through-wall cracks or other defects which require that the defect-containing length portion of the tube be pulled.

One embodiment of the puller consists of two separate pulling systems. The first system is the primary or lower puller which engages the tube length portion in a tapped inner section adjacent the tubesheet from which the tube-to-tubesheet weld has been cut. The threaded puller bar is in the form of a tube mounted for movement relative to a central axially moving means of the second system or upper gripper combination.

The upper gripper combination central axially moving means has a mandrel collar nut which drives actuating means in the form of sleeve ends into compression against the means for radial outward tube length gripping movement. The latter is in the form of mating frusto-conical male and female ferrules. The upper gripper combination has an upper and lower means for radial outward tube length gripping movement, which upon being urged by the acutator means sleeves, grips the tube length portion in two locations at opposite ends of a defect-containing length portion of the tube. Thus, axial removal of the defect-containing length portion and the tool from the tubesheet opening may be easily accomplished.

In operation, the primary puller bar or sleeve is actually a thick-walled tube which serves as part of the upper gripper combination's outer sleeves which are loaded in compression, while the inner mandrel is loaded in tension from the pre-load applied from operation of a hydraulic jack, purchased commercially as ENERPAC Jack Model RCH-120.

A hand pump with a gage located remotely outside of the primary head of the steam generator actuates the jack to expand the frusto-conical ferrules above and below the tube defect. The ferrules are sized so that when the male ferrules make up solid with the acutation means sleeves, the female ferrules expand radially out into gripping contact with the inner diameter of the tube.

Another embodiment of the puller utilizes independently actuated collets with spring fingers for the radial outward tube length portion gripping movement. The spring fingers are urged outwardly by actuating means in the form of tapered portions on the central mandrel and mandrel sleeve member or means for moving axially relative to the tube. No engagement with the tube adjacent the tubesheet is required for this embodiment but one can be provided. In both embodiments the tubesheet weld around the tube must be cut.

BRIEF DESCRIPTION OF THE DRAWINGS

FIG. 1 is a cross-sectional elevational view of a double gripper tube puller tool constructed according to the principals of the invention.

FIG 1a is a fragmentary schematic enlargement of area 1a of FIG. 1.

FIG. 1b is a fragmentary schematic enlargement of area 1b of FIG. 1.

DETAILED DESCRIPTION OF THE EMBODIMENTS

Figure 2:
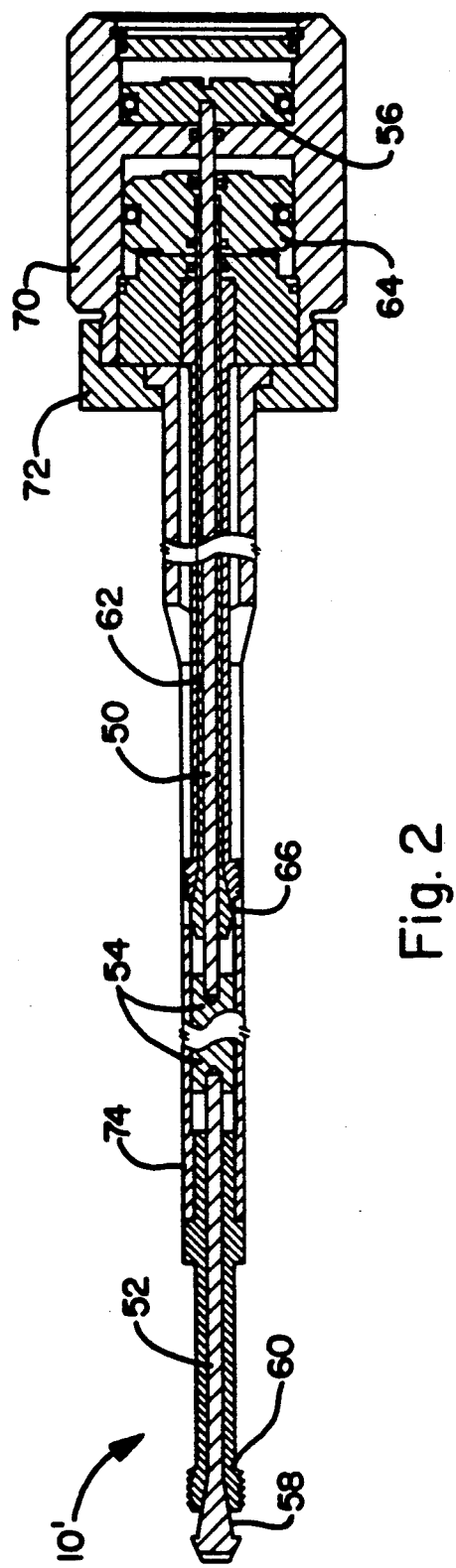
FIG. 2 is a cross-sectional elevational view of a different embodiment of double gripper tube puller tool constructed according to the principals of the invention.

The tool of the invention for axially removing a defect-containing length portion of a tube from a tubesheet is generally designated by the numeral 10.

The tool 10 includes a mandrel rod 12 and expander rod 13 threadedly attached thereto with a collar nut 14 threaded on its end.

Abutting the nut 14 are sets of frusto-conical male ferrules 16 spacers 18, and expanding female ferrules 20 which make up the upper gripper and which surround the expander rod 13, as shown in FIG. 1a. A sleeve 22 is located between the upper gripper of FIG. 1a and the lower gripper and its elements as seen in FIG. 1b. The tool 10 is inserted into the defective tube of a tubesheet until sleeve 22 is opposite the defect with the upper gripper of FIG. 1a above the defect and the lower griper of FIG. 1b below the defect. A backup sleeve 23 is on the lower side of the lower gripper of FIG. 1b.

A tube gripper known as the primary gripper, in the form of threads 24 on puller bar sleeve 26, surrounds mandrel rod 12 and is movable relative thereto. The tubesheet which is the tube support member of a steam generator (not shown) has an opening into which the tube normally fits and is welded. The tube-to-tubesheet weld is cut and the tube is tapped manually to provide threads in the tube for engagement by threads 24. The primary puller bar 26 is threaded manually into the tapped tube thus engaging threads 24. Lock nut 28 threaded on the end of bar 26 and lever 30 thereon facilitate this operation from the primary side of the tubesheet.

The secondary upper gripper combination is actuated by means of the jack 32 receiving hydraulic fluid from a remote hand pump via line 34. Relative motion between mandrel rod 12, the secondary upper gripper means it activates and the primary puller bar 26 is thus created since mandrel bar 12 is attached to the jack 32 by means of threaded lock bolt 36 and lock nut 38 with lever 40.

Figure 3:
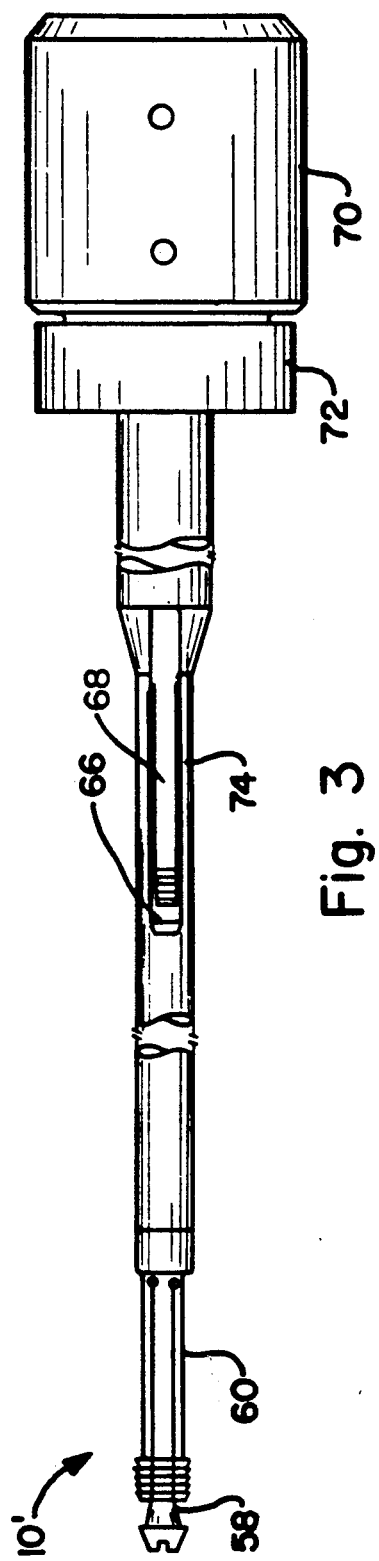
FIG. 3 is a side elevational view of the tool of FIG. 2 taken at 90° thereto.

The embodiment of FIGS. 2 and 3 is generally designated 10'. This device consists of an upper tube gripper and an independently actuated lower tube gripper. The upper tube griper is made up of a central mandrel 50 and extension 52 threadedly secured thereto by coupling 54. The mandrel is driven by hydraulic piston 56. The actuating means of mandrel extension 52 is a tapered portion 58 which urges collet spring fingers 60 radially outwardly into the defect-containing length portion above the defect.

The lower tube gripper lies below the defect and is a sleeve means 62 which moves axially along the outside of mandrel 50 upon actuation by separately actuated hydraulic piston 64. The latter piston in driving sleeve 62 along mandrel member 50 has its tapered portion 66 radially outwardly urge toothed spring fingers 68 of a collet member fixed to the hydraulic cylinder block 70. A cap nut 72 on cylinder block 70 holds the outer collet body member 74 on which upper collet fingers 60 are mounted.

Thus, two embodiments of a tool with the ability to remove a defect-containing length portion of a tube from the primary side of a steam generator tubesheet without its breaking at the defect are provided and described.

What is claimed is:

1. A tool for axially removing from a steam generator tube support member having a primary side, a defect-containing length portion of a tube and a tube portion between said length portion and said primary side, said tool comprising in combination:

means for moving axially relative to a tube and support member to drive actuating means adjacent each of two locations at opposite ends of a defect-containing length portion of the tube;

means for radial outward tube length portion gripping movement mounted adjacent said actuating means and said two locations for movement relative to said means for moving axially upon urging by said actuating means;

means for engaging the inside of the tube portion between the defect containing length portion and the primary side; and said means for radial outward tube length portion gripping movement upon being urged by said actuating means retaining the defect-containing length portion and the tube portion between said length portion and the primary side intact for ease of axial removal of the length portion and the tool from the support member primary side.

2. The tool of claim 1 in which the means for radial outward tube length portion gripping movement includes a collet with spring fingers.

3. The tool of claim 1 in which the means for radial outward tube length portion gripping movement includes a pair of frusto-conical ferrules engaged for relative movement therebetween.

4. The tool of claim 1 in which the means for engaging the tube portion between said length portion and said primary side is a threaded portion.

5. The tool of claim 1 in which the means for moving axially is driven by fluid pressure.

* * * * *